US009549347B2

(12) United States Patent
Cucala Garcia et al.

(10) Patent No.: US 9,549,347 B2
(45) Date of Patent: Jan. 17, 2017

(54) METHOD, SYSTEM AND COMPUTER PROGRAM PRODUCT FOR INTER-WORKING BETWEEN DIFFERENT WIRELESS TECHNOLOGIES

(71) Applicant: Telefonica, S.A., Madrid (ES)

(72) Inventors: Luis Cucala Garcia, Madrid (ES); Wsewolod Warzanskyj Garcia, Madrid (ES)

(73) Assignee: Telefonica, S.A., Madrid (ES)

( * ) Notice: Subject to any disclaimer, the term of this patent is extended or adjusted under 35 U.S.C. 154(b) by 83 days.

(21) Appl. No.: 14/571,485

(22) Filed: Dec. 16, 2014

(65) Prior Publication Data
US 2015/0172959 A1 Jun. 18, 2015

(30) Foreign Application Priority Data

Dec. 17, 2013 (EP) .................................... 13382520

(51) Int. Cl.
| | |
|---|---|
| H04W 36/00 | (2009.01) |
| H04W 36/14 | (2009.01) |
| H04W 36/38 | (2009.01) |
| H04L 12/24 | (2006.01) |
| H04W 12/06 | (2009.01) |
| H04W 48/18 | (2009.01) |
| H04W 8/02 | (2009.01) |
| H04W 84/12 | (2009.01) |
| H04W 92/02 | (2009.01) |
| H04W 12/02 | (2009.01) |
| H04W 84/04 | (2009.01) |
| H04W 92/10 | (2009.01) |

(52) U.S. Cl.
CPC ...... *H04W 36/0011* (2013.01); *H04L 41/0233* (2013.01); *H04W 8/02* (2013.01); *H04W 12/02* (2013.01); *H04W 12/06* (2013.01); *H04W 36/14* (2013.01); *H04W 36/385* (2013.01); *H04W 48/18* (2013.01); *H04W 84/12* (2013.01); *H04W 92/02* (2013.01); *H04W 84/045* (2013.01); *H04W 92/10* (2013.01)

(58) Field of Classification Search
CPC ....... H04W 36/14; H04W 36/16; H04W 36/00
USPC .................................................. 455/436–444
See application file for complete search history.

(56) References Cited

U.S. PATENT DOCUMENTS

| | | | | |
|---|---|---|---|---|
| 2008/0076425 | A1* | 3/2008 | Khetawat | H04W 88/12 455/436 |
| 2008/0102794 | A1* | 5/2008 | Keevill | H04L 12/5692 455/411 |
| 2014/0171074 | A1* | 6/2014 | Ganapathy | H04W 8/186 455/434 |

* cited by examiner

*Primary Examiner* — Kamran Afshar
*Assistant Examiner* — Farideh Madani
(74) *Attorney, Agent, or Firm* — Sughrue Mion, PLLC

(57) ABSTRACT

A method, system and computer program for inter-working between different wireless technologies. The method including connecting a base station wirelessly connected to a mobile terminal, both complying with standardized wireless radio access technology, with a MME and/or a SGW of the EPC of the 3GPP standard by a NAS function included in the base station. The NAS function collecting a MAC address of the mobile terminal and generating an IMSI identity based on the collecting; providing the generated IMSI to the MME and storing it together with a set of parameters and algorithms; performing, with the MME or with a HSS an authentication and ciphering procedure of the mobile terminal using the stored set of parameters and algorithms, and performing the termination of the NAS protocol messages with the MME for management procedures related with the mobile terminal, the wireless radio access technology and the 3GPP standard being different technologies.

9 Claims, 5 Drawing Sheets

METHOD, SYSTEM AND COMPUTER PROGRAM PRODUCT FOR INTER-WORKING BETWEEN DIFFERENT WIRELESS TECHNOLOGIES

CROSS REFERENCE TO RELATED APPLICATIONS

This application claims priority based on European Patent Application No. 13382520.8 filed Dec. 17, 2013, the contents of all of which are incorporated herein by reference in their entirety.

FIELD OF THE ART

The present invention generally relates to the field of mobile broadband services. Particularly, the present invention relates to a method, a system and a computer program product for inter-working between different wireless technologies.

BACKGROUND OF THE INVENTION

The provision of mobile broadband services requires the tight integration of radio access technologies based on third generation Partnership Project (3GPP) standards and on IEEE standards. 3GPP radio access and core network architecture considers IEEE radio access technologies, in particular the so called Wi-Fi based on IEEE 802.11, as non-3GPP technologies, whose integration with the 3GPP architecture requires a connection to the core network that is different to that of the 3GPP's radio access network nodes. This IEEE radio access nodes special connection to the core demands the inclusion of additional network nodes and the implementation of special methods for procedures like authentication, handover or session continuity, increasing the complexity of the network. Besides, the interconnection between networks at core level entails a processing delay than prevents or hinders the introduction of common Radio Resource Control (RRC) procedures, with an associated loss in overall spectrum efficiency.

3GPP comprises the base stations, which are called eNB's, the mobile terminals, which are called User Equipment (UE), and the radio interface between the UE's and the eNB's, which is called Uu. 3GPP RAN is connected to the mobile network core, which is called Evolved Packet Core (EPC), to two specific nodes called Mobility Management Element (MME) and Serving Gateway (SGW).

The basic procedures defined in 3GPP for the inter-working of 3GPP networks and non-3GPP networks are described in TS 23.234 [1]. This specification defines procedures in the 3GPP system for WLAN Access, Authentication and Authorisation (AAA), which provide for access to the WLAN and a locally connected IP network (e.g. Internet) to be authenticated and authorised through the 3GPP System. Access to a locally connected IP network from the WLAN is referred to as WLAN Direct IP Access. This specification also defines procedures for WLAN 3GPP IP Access, which allows WLAN UE's to establish connectivity with external IP networks, such as 3G operator networks, corporate Intranets or the Internet via the 3GPP system.

FIG. 1 illustrates a general inter-working architecture specified in TS 23.234. In this architecture, a non-trusted Wi-Fi Access Point (AP) can provide service to a UE through the so-called Ww interface, and this AP is connected to the 3GPP's core network through a so-called Wireless Access Gateway (WAG), which implements firewall security and tunnel termination procedures. The WAG is connected to 3GPP's Packet Data Gateway (PDG). In the case of a trusted Wi-Fi AP, it is directly connected to the PDG at the Wu reference point. In both cases, the connection to the 3GPP core is done in the PDG, and not to the nodes that are used by 3GPP's radio access network (RAN), the Mobility Management Entity (MME) and the Serving Gateway (SGW).

On the other hand, TS 23.402 describes some architecture enhancements for non-3GPP accesses that include an Access Network Discovery and Selection Function (ANDSF) [2]. The ANDSF is an entity in 3GPP's core network, whose objective is to assist the UE to discover non-3GPP access networks such as IEEE 802.11 and to provide the UE with rules policing the connection to these networks. The ANDSF contains data management and control functionality necessary to provide network discovery and selection assistance data based on network operators' policy. The ANDSF responds to UE requests for access network discovery information and may be able to initiate data transfer to the UE, based on network triggers or as a result of previous communication with the UE.

3GPP has also approved a "WLAN/3GPP Radio Inter-working" study item (SI) whose current output is captured in TR 37.834 [3]. This document studies procedures to improve 3GPP and non-3GPP interworking at the RAN level, and proposes some solutions for Access Network Selection and Traffic Steering. This solution is focused on the 3GPP RAN providing assistance to the UE for the selection of the best radio access network, complementary to the solutions based on ANDSF.

In the side of the non-3GPP radio access networks specifications, the Wi-Fi Alliance has standardized its own procedures for simplifying UE connectivity to an Access Point (AP), the so-called Hot Spot 2.0 [4], which is a set of protocols that facilitate Wi-Fi AP operation, including Wi-Fi AP discovery, selection and authentication. In its latest release 2 it includes the possibility to set some operator's policies regarding which AP to connect to, which are similar to the procedures proposed by 3GPP with the ANDSF. IEEE 802.11 radio access makes use of the layered OSI protocol stack. The lower layer is the Physical Layer (PHY) which is particular for every specific version of the IEEE 802.11 radio access version. On top of the PHY layer is the Media Access Control (MAC), which provides radio access control services to the different terminals served by an AP, along with error correction procedures. On top of the MAC layer is the Logical Link Control (LLC) layer, which provides multiplexing services for interfacing with the upper Network Layer. In IEEE 802.11 radio access, the LLC layer follows the IEEE 802.2 standard [5] and the MAC and PHY layers are specified in [6]. On top of the LLC layer is the network layer, typically based on the Internet Protocol (IP), which is not part of the IEEE 802.11 specification.

FIG. 2 illustrates the control plane protocol stack for the case of the 3GPP radio access network (RAN) and the evolved packet core (EPC), and FIG. 3 illustrates the user plane protocol stack for the case of the 3GPP radio access network (RAN) and the evolved packet core (EPC).

3GPP radio access interface between the eNB and the user equipment (UE) is called Uu interface. The control plane interface between the eNB and the MME is called S1-MME, and the user plane interface between the eNB and the SGW is called S1-U. The protocol stack for the Uu interface is divided in a user plane protocol stack and a control plane protocol stack, as it is described in [7][7].

The control plane Uu interface protocol stack includes the Non-access Stratum (NAS) control protocol (terminated in the mobility management entity, MME, on the network side), which performs among other things: Evolved Packet System (EPS) bearer management, authentication, mobility handling, paging origination and security control.

The non-access stratum (NAS) is the highest layer of the control plane between the UE and the MME. The main functions of the protocols that are part of the NAS are the support of mobility of the user equipment (UE); and the support of session management procedures to establish and maintain IP connectivity between the UE and a packet data network gateway (PDN GW). NAS security is an additional function of the NAS providing services to the NAS protocols, e.g. integrity protection and ciphering of NAS signalling messages. NAS protocol is described in [8] describing the modes of operation of a UE connected to the Evolved Packet System (EPS). A UE attached for EPS services shall operate in one of the following operation modes:

PS mode 1 of operation: the UE registers only to EPS services, and UE's usage setting is "voice centric";

PS mode 2 of operation: the UE registers only to EPS services, and UE's usage setting is "data centric";

CS/PS mode 1 of operation: the UE registers to both EPS and non-EPS services, and UE's usage setting is "voice centric"; and CS/PS mode 2 of operation: the UE registers to both EPS and non-EPS services, and UE's usage setting is "data centric".

The NAS protocol includes a set of mobility management messages between the UE and the MME, including UE identity request and UE identity response messages. The Identity request message is sent by the MME to the UE to request the UE to provide its identity.

The Identity response message is sent by the UE to the network in response to an IDENTITY REQUEST message and provides the requested identity. The message content is summarized in table 1.

TABLE 1

IDENTITY RESPONSE message content

| IEI | Information Element | Type/Reference |
|---|---|---|
|  | Protocol discriminator | Protocol discriminator |
|  | Security header type | Security header type |
|  | Identity response message | Message type |
|  | Mobile identity | Mobile identity 9.9.2.3 |

The mobile identity reported in the IDENTITY RESPONSE message follows the specification described in 3GPP TS 24.008 [9][9] and specifies that the purpose of the Mobile Identity information element is to provide, among others, either the international mobile subscriber identity, IMSI, the temporary mobile subscriber identity, TMSI, or the international mobile equipment identity, IMEI. The Mobile Identity information element is coded as shown in table 2, with a minimum length of 3 octets and 11 octets length maximal.

TABLE 2

Mobile Identity information element

| 8 | 7 | 6 | 5 | 4 | 3 | 2 | 1 | |
|---|---|---|---|---|---|---|---|---|
| | | | Mobile Identity IEI | | | | | octet 1 |
| | | | Length of mobile identity contents | | | | | octet 2 |
| Identity digit 1 | | | | odd/even indic | Type of identity | | | octet 3 |
| Identity digit p + 1 | | | | Identity digit p | | | | octet 4* |

The contents of every octet in the Mobile Identity information element are as described in table 3:

TABLE 3

Mobile Identity information element content

Type of identity (octet 3)
Bits
3 2 1
0 0 1   IMSI
0 1 0   IMEI
0 1 1   IMEISV
1 0 0   TMSI/P-TMSI/M-TMSI
1 0 1   TMGI and optional MBMS Session Identity
0 0 0   No Identity (note 1)
All other values are reserved.
Odd/even indication (octet 3)
Bit
4
0   even number of identity digits and also when the TMSI/P-TMSI or TMGI and optional MBMS Session Identity is used
1   odd number of identity digits
Identity digits (octet 3 etc)
For the IMSI, IMEI and IMEISV this field is coded using BCD coding. If the number of identity digits is even then bits 5 to 8 of the last octet shall be filled with an end mark coded as "1111".
For Type of identity "No Identity", the Identity digit bits shall be encoded with all 0s and the Length of mobile identity contents parameter shall be set to one of the following values:
"1" if the identification procedure is used (see subclause 9.2.11);
"3" if the GMM identification procedure is used (see subclause 9.4.13)
"3" if the EMM identification procedure is used (see 3GPP TS 24.301 [120])
If the mobile identity is the TMSI/P-TMSI/M-TMSI then bits 5 to 8 of octet 3 are coded as "1111" and bit 8 of octet4 is the most significant bit and bit 1 of the last octet the least significant bit. The coding of the TMSI/P-TMSI is left open for each administration.

TABLE 3-continued

Mobile Identity information element content

For type of identity "TMGI and optional MBMS Session Identity" the coding of octet 3 etc is as follows:
MCC/MNC indication (octet 3)
Bit
5
0   MCC/MNC is not present
1   MCC/MNC is present
MBMS Session Identity indication (octet 3)
Bit
6
0   MBMS Session Identity is not present
1   MBMS Session Identity is present
MBMS Service ID (octet 4, 5 and 6)
The contents of the MBMS Service ID field are coded as octets 3 to 5 of the Temporary Mobile Group Identity IE in FIG. 10.5.154/3GPP TS 24.008. Therefore, bit 8 of octet 4 is the most significant bit and bit 1 of octet 6 the least significant bit. The coding of the MBMS Service ID is the responsibility of each administration. Coding using full hexadecimal representation may be used. The MBMS Service ID consists of 3 octets.
MCC, Mobile country code (octet 6a, octet 6b bits 1 to 4)
The MCC field is coded as in ITU-T Rec. E.212 [46], Annex A.
MNC, Mobile network code (octet 6b bits 5 to 8, octet 6c)
The coding of this field is the responsibility of each administration but BCD coding shall be used. The MNC shall consist of 2 or 3 digits. If a network operator decides to use only two digits in the MNC, bits 5 to 8 of octet 6b shall be coded as "1111".
The contents of the MCC and MNC digits are coded as octets 6 to 8 of the Temporary Mobile Group Identity IE in FIG. 10.5.154/3GPP TS 24.008.
MBMS Session Identity (octet 7)
The MBMS Session Identity field is encoded as the value part of the MBMS Session Identity IE as specified in 3GPP TS 48.018 [86].

The S1 interface transports the S1 application protocol (S1AP) [10], on top of a stream control transmission protocol (SCTP) layer, an internet protocol (IP) layer, and any OSI's L2 and L1 layers. S1AP provides the signalling service between E-UTRAN and the evolved packet core (EPC) that is required to fulfill, among others, the following S1AP functions:

UE Capability Info Indication function: This functionality is used to provide the UE Capability Info, when received from the UE, to the MME.

Non-access stratum (NAS) signalling transport function between the UE and the MME is used to transfer NAS signalling related information and to establish the S1 UE context in the eNB.

RAN Information Management (RIM) function: This functionality allows the request and transfer of RAN information between two RAN nodes via the core network.

Configuration Transfer function: This functionality allows the request and transfer of RAN configuration information (e.g., SON information) between two RAN nodes via the core network.

S1AP services are divided into two groups: non UE-associated services, which are related to the whole S1 interface instance between the eNB and MME utilizing a non UE-associated signalling connection, and UE-associated services, which are related to one UE. S1AP consists of Elementary Procedures (EP's). An Elementary Procedure is a unit of interaction between an eNB and the evolved packet core (EPC). These Elementary Procedures are defined separately and are intended to be used to build up complete sequences in a flexible manner.

An EP consists of an initiating message and possibly a response message. Two kinds of EP's are used:

Class 1: Elementary Procedures with response (success and/or failure), which includes, among others, S1 SETUP REQUEST and S1 SETUP RESPONSE messages Class 2: Elementary Procedures without response, which includes, among others, UE CAPABILITY INFO INDICATION and eNB DIRECT INFORMATION TRANSFER messages.

Every EP involves an exchange of messages between an eNB and the EPC, and every message consists of a set of information elements (IE). S1AP messages and IE's are described in [10].

Some relevant messages are as follows:

UE CAPABILITY INFO INDICATION message: This message is sent by the eNB to provide UE Radio Capability information to the MME. This message includes the following IE's:

| IE/Group Name |
| --- |
| Message Type |
| MME UE S1AP ID |
| eNB UE S1AP ID |
| UE Radio Capability |

The UE Radio Capability IE is defined as follows

| IE/Group Name | IE Type and Reference | Semantics Description |
| --- | --- | --- |
| UE Radio Capability | OCTET STRING | Includes the UERadioAccessCapabilityInformation message |

The UE Radio Access Capability Information message is a RRC message. This message is used to transfer UE radio access capability information, from/to the eNB to/from EPC.

| UERadioAccessCapabilityInformation field descriptions |
| --- |
| ue-RadioAccessCapabilityInfo<br>Including E-UTRA, GERAN, and CDMA2000-1xRTT Bandclass radio access capabilities (separated). UTRA radio access capabilities are not included. | eNB DIRECT INFORMATION TRANSFER message: This message is sent by the eNB to the MME in order to transfer specific information. This message includes the following IE's:

| IE/Group Name |
| --- |
| Message Type<br>Inter-system Information<br>Transfer Type |

The Inter-system Information Transfer Type IE indicates the type of information that the eNB requests to transfer, and it is defined as follows

| IE/Group Name |
| --- |
| Inter-system Information<br>Transfer Type<br>>RIM<br>>>RIM Transfer |

The RIM Transfer IE is a NAS IE, and it contains the RAN Information Management (RIM Information. The RIM Transfer IE is defined as follows:

| IE/Group Name |
| --- |
| RIM Transfer<br>>RIM Information<br>>RIM Routing Address |

The RIM Information IE is defined as follows:

| IE/Group Name | IE type and reference | Semantics description |
| --- | --- | --- |
| RIM Information<br>>RIM Information | OCTET STRING | Contains the base station subsystem GPRS Protocol (BSSGP) RIM packet data unit (PDU). |

RIM procedures support the exchange of information, via the core network, between peer application entities located in a GERAN, in a UTRAN or in an E-UTRAN access network [11].

S1 SETUP REQUEST MESSAGE: This message is sent by the eNB to the MME to transfer information for a Transport Network Layer (TNL) association. This message includes the following IE's:

| IE/Group Name |
| --- |
| Message Type<br>Global eNB ID<br>eNB Name |

| IE/Group Name |
| --- |
| Supported Tracking<br>Areas (TA)<br>>Tracking Area<br>codeTAC<br>>Broadcast PLMNs<br>>>PLMN Identity<br>Default paging DRX<br>CSG Id List<br>>CSG Id |

This Global eNB ID information element is used to globally identify an eNB, and it is specified as follows.

| IE/Group Name | IE type and reference | Semantics description |
| --- | --- | --- |
| PLMN Identity<br>eNB ID<br>>Macro eNB ID<br>>>Macro eNB ID | BIT STRING (20) | Equal to the 20 leftmost bits of the Cell Identity IE contained in the E-UTRAN CGI IE of each cell served by the eNB. |
| >Home eNB ID<br>>>Home eNB ID | BIT STRING (28) | Equal to the Cell Identity IE contained in the E-UTRAN CGI IE of the cell served by the eNB. |

The E-UTRAN CGI information element is used to globally identify a cell, and it is specified as follows.

| IE/Group Name | IE type and reference | Semantics description |
| --- | --- | --- |
| PLMN Identity<br>Cell Identity | BIT STRING (28) | The leftmost bits of the Cell Identity correspond to the eNB ID |

On the other hand, the Generic Access Network (GAN) is a system that extends a 3GPP mobile terminal access to the 3GPP core network by making use of non-3GPP radio access technologies like IEEE 802.11. Under the GAN system, when the 3GPP-compliant mobile terminal detects an IEEE 802.11 radio interface, it establishes a secure IP connection to a server called a GAN Controller (GANC) on the operator's network. The GANC presents the 3GPP-compliant mobile terminal to the mobile core network as if it were connected to a standard 3GPP base station. Thus, when the 3GPP-compliant mobile terminal moves from a GSM/UMTS access network to an 802.11 network, it appears to the core network as if it is simply on a different base station.

GAN Iu mode supports an extension of UMTS mobile services that is achieved by tunnelling Non Access Stratum (NAS) protocols between the 3GPP-compliant mobile terminal and the Core Network over an IP network and the Iu-cs and Iu-ps interfaces to the MSC and SGSN, respectively, as it is described in [12].

The Generic Access Network Iu mode functional architecture is illustrated in FIG. 4. A generic IP access network, which can be Wi-Fi AP that provides a IEEE 802.11 radio interface, provides connectivity between the 3GPP-compliant mobile terminal (mobile station, MS) and the GANC. The IP transport connection extends from the GANC to the MS.

FIG. 5 illustrates the GAN Iu mode architecture in support of the packet-switched (PS) domain Control Plane and FIG. 6 illustrates the GAN Iu mode architecture for the PS domain User Plane.

3GPP specification [12] specifically states in its section 6.4.1.1 "PS Domain-Control Plane—GAN Architecture" that NAS protocols are carried transparently between the MS and SGSN. Therefore, the GAN system cannot provide service to mobile terminals not compliant with 3GPP specifications, which do not support a NAS protocol with the core network. On the other hand, 3GPP defines [13][13] non-3GPP access authentication as the process that is used for access control i.e. to permit or deny a subscriber to attach to and use the resources of a non-3GPP IP access which is interworked with the EPC network. Non-3GPP access authentication signalling is executed between the UE and the 3GPP AAA server/HSS. One example is the Extensible Authentication Protocol (EAP) as specified in RFC 3748.

For the identification of a mobile subscriber a unique International Mobile Subscriber Identity (IMSI) is allocated to each mobile subscriber in the GSM/UMTS/EPS system [14], which is stored in the mobile terminal SIM card. The IMSI number is composed of three parts:

1) Mobile Country Code (MCC) consisting of three digits. The MCC identifies uniquely the country of domicile of the mobile subscriber.
2) Mobile Network Code (MNC) consisting of two or three digits. The MNC identifies the home PLMN of the mobile subscriber.
3) Mobile Subscriber Identification Number (MSIN) consisting of up to nine digits identifying the mobile subscriber within a PLMN.

[14] also describes a temporal subscriber identifiers, namely the Temporary Mobile Subscriber Identity TMSI.

The description of the S1AP protocol in [10] also includes a set of UE identities that are used in NAS related Information Elements, namely MME UE S1AP ID, eNB UE S1AP ID, UE Identity Index value, and UE Paging Identity.

Regarding security and ciphering procedures, [15] specifies the security architecture, i.e., the security features and the security mechanisms for the Evolved Packet System and the Evolved Packet Core, and the security procedures performed within the evolved Packet System (EPS) including the Evolved Packet Core (EPC) and the Evolved UTRAN. This document describes the authentication and ciphering procedures performed between the USIM card in a 3GPP-compliant mobile terminal and the MME/HSS. EPS AKA is the authentication and key agreement procedure that is used over E-UTRAN.

The problem with current 3GPP standards is that they consider IEEE radio access technologies; in particular Wi-Fi based on IEEE 802.11, as non-3GPP technologies, whose integration with the 3GPP architecture requires a connection to the core network that is different to that of the 3GPP's radio access network nodes.

The 3GPP standard does not foresee the connection of a base station that does not support a 3GPP radio interface to the same nodes that standard 3GPP base stations are connected to. Therefore, an IEEE 802.11 Access Point cannot be connected to the SGSN or to the MME/SGW.

This IEEE radio access nodes special connection to the core demands the inclusion of additional network nodes and the implementation of special methods for procedures like paging, handover or session continuity, increasing the complexity of the network. Besides, the connection at core level prevents the introduction of common Radio Resource Control management procedures.

On the other hand, GAN procedures cannot provide connectivity to the mobile core network to mobile terminal not compliant with 3GPP specifications, as they cannot support a NAS protocol communication with the core network.

REFERENCES

[1] 3GPP TS 23.234 "Technical Specification Group Services and System Aspects; 3GPP system to Wireless Local Area Network (WLAN) interworking; System description".
[2] 3GPP TS 23.402 "Technical Specification Group Services and System Aspects; Architecture enhancements for non-3GPP accesses". Section 4.8 Network Discovery and Selection.
[3] 3GPP TR 37.834" Technical Specification Group Radio Access Network; Study on WLAN/3GPP Radio Interworking (Release 12)".
[4] Wi-Fi Alliance Technical Committee. Hotspot 2.0 Technical Task Group. "Hotspot 2.0 (Release 1) Technical Specification 6 Version 1.0.0"
[5] IEEE Standard for Information technology. Telecommunications and information exchange between systems. Local and metropolitan area networks Specific requirements. Part 2: "Logical Link Control".
[6] IEEE Standard for Information technology. Telecommunications and information exchange between systems. Local and metropolitan area networks Specific requirements. Part 11: "Wireless LAN Medium Access Control (MAC) and Physical Layer (PHY) Specifications".
[7] 3GPP TS 36.300 "Technical Specification Group Radio Access Network; Evolved Universal Terrestrial Radio Access (E-UTRA) and Evolved Universal Terrestrial Radio Access Network (E-UTRAN); Overall description; Stage 2". Section 4.3 Radio Protocol architecture.
[8] 3GPP TS 24.301 "Technical Specification Group Core Network and Terminals; Non-Access-Stratum (NAS) protocol for Evolved Packet System (EPS); Stage 3"
[9] 3GPP TS 24.008 "Technical Specification Group Core Network and Terminals; Mobile radio interface Layer 3 specification; Core network protocols". Section 10.5.1.4 Mobile Identity
[10] 3GPP TS 36.413 "Technical Specification Group Radio Access Network; Evolved Universal Terrestrial Radio Access (E-UTRA) and Evolved Universal Terrestrial Radio Access Network (E-UTRAN); S1 Application Protocol (S1AP)"
[11] 3GPP TS 48.018 "Technical Specification Group GSM/EDGE Radio Access Network; General Packet Radio Service (GPRS); Base Station System (BSS)—Serving GPRS Support Node (SGSN); BSS GPRS Protocol (BSSGP)"
[12] 3GPP TS 43.318 "Technical Specification Group GSM/EDGE Radio Access Network; Generic Access Network (GAN); Stage 2"
[13] 3GPP TS 23.402 "Technical Specification Group Services and System Aspects; Architecture enhancements for non-3GPP accesses"
[14] 3GPP TS 23.003 "3rd Generation Partnership Project; Technical Specification Group Core Network and Terminals; Numbering, addressing and identification"
[15] 3GPP TS 33.401 "3rd Generation Partnership Project; Technical Specification Group Services and System Aspects; 3GPP System Architecture Evolution (SAE); Security architecture"

SUMMARY OF THE INVENTION

To overcome the aforementioned problems the present invention provides a solution that allows connecting a base station that does not support an interface of the standard 3GPP such as the Uu radio interface of LTE, for instance because said base station has an IEEE 802.11 interface, directly to the MME/SW of the Evolved Packet Core (EPC), without any intermediate node, and allowing the EPC to process the group 3GPP user terminal and non-3GPP base station through its common interfaces.

Therefore, in accordance to a first aspect there is provided, a method for inter-working between different wireless technologies, wherein a base station complying with a standardized wireless radio access technology provides wireless connectivity via a particular communication interface to at least one user mobile terminal also complying with said standardized wireless radio access technology. The proposed method, on contrary of known proposals in the field comprises connecting said base station with a Mobility Management Entity or MME and/or a Serving Gateway or SGW of the EPC of the 3GPP standard technology by performing following steps:

- using a Non Access Stratum function included in said base station that collects a MAC address of the user mobile terminal and further generates an international mobile subscriber identity or IMSI based in said collected MAC address;
- providing, said Non Access Stratum function included in said base station, upon receiving from said MME entity an identity request for said at least one user mobile terminal, said generated IMSI to a Non Access Stratum function included in said MME entity. The providing of the generated IMSI being performed via a S1 interface and based on a Non Access Stratum protocol or NAS protocol and said MME entity being communicated with a Home Subscription Server or HSS;
- storing, by said Non Access Stratum function included in said base station, said generated IMSI together with a set of parameters and algorithms; and
- performing, between said Non Access Stratum function included in said base station and said MME entity and HSS an authentication and ciphering procedure of said at least one user mobile terminal by using said stored set of parameters and algorithms,
- performing, by said Non Access Stratum function protocol in said base station, the termination of Non Access Stratum protocol messages with said MME entity, for the management of mobility, paging and location procedures related with said at least one user mobile terminal, wherein said standardized wireless radio access technology and said 3GPP standard technology are different wireless technologies.

As a preferred option of the invention, the standardized wireless radio access technology comprises an IEEE standard radio access technology at least according to the IEEE 802.11 standard (without being limitative).

In an embodiment, in the authentication and ciphering procedure the Non Access Stratum function included in said base station can send to said Non Access Stratum function in said MME entity, a S1 setup request message comprising a Global eNB ID information element that includes an identifier categorizing said base station as a 3GPP standard technology uncompliant.

In addition, the Non Access Stratum function included in said base station can also send to said Non Access Stratum function in said MME entity a direct information transfer message comprising an Inter-system Information Transfer Type information element that includes a radio access network, RAN, information management, RIM element containing radio access network information management information management packet data units, RIM PDU's, indicating characteristics of said standardized wireless radio access technology. Furthermore, the Non Access Stratum function included in said base station may further send to said Non Access Stratum function in said MME entity a UE Radio Capability information message including an octet string that describes the technology supported by said particular communication interface used to provide the wireless connectivity between the base station and the at least one user mobile terminal.

So, the operation mode of the user mobile terminal can be set up, by said MME entity, as a PS mode 2 describing said user mobile terminal as data centric. In this case, the user mobile terminal and the MME entity will exchange information via the Non Access Stratum function included in said base station.

In another embodiment, said authentication and ciphering procedure can be performed by an extensible authentication protocol based on a wireless connection point module included in the user mobile terminal using authentication credentials of the latter. The authentication protocol in this case would be established between the Non Access Stratum function included in said base station and the Non Access Stratum function included in said MME entity. Then, an Access Network Query Protocol, ANQP transported by the NAS protocol would be established between the Non Access Stratum function included in said base station and the Non Access Stratum function included in said MME entity for supporting the wireless connection point module and the extensible authentication protocol.

In accordance to a second aspect there is provided, a system for inter-working between different wireless technologies, comprising as commonly in the field base station complying with a standardized wireless radio access technology providing wireless connectivity via a particular communication interface to at least one user mobile terminal also complying with said standardized wireless radio access technology. On contrary of the known proposal in the system of the second aspect said base station further includes:

- means configured to implement an interface to communicate with a Serving Gateway of the EPC of the 3GPP standard technology;
- means configured to implement an interface to communicate with a Mobility Management Entity or MME of said 3GPP standard technology;
- means configured to implement a plurality of interfaces to communicate with at least a base station complying with said 3GPP standard technology; and
- means configured to implement a Non Access Stratum function configured to:
  - collect a MAC address of said user mobile terminal and further generate an international mobile subscriber identity or IMSI based in said collected MAC address;
  - provide, upon receiving an identity request from said MME entity for said at least one user mobile terminal, said generated IMSI via said interface communicating the base station and the MME entity and based on a Non Access Stratum protocol or NAS protocol to a Non Access Stratum function included in said MME entity;
  - store said generated IMSI together with a set of parameters and algorithms;

perform with said MME entity and a Home Subscription Server or HSS an authentication and ciphering procedure of said at least one user mobile terminal by using said stored set of parameters and algorithms; and perform, the termination of Non Access Stratum protocol messages with said MME entity, for the management of mobility, paging and location procedures related with said at least one user mobile terminal wherein said standardized wireless radio access technology and said 3GPP standard technology are different wireless technologies.

In an embodiment, the at least one user mobile terminal includes a wireless connection point module and means configured to support an extensible authentication protocol and the Non Access Stratum function included in said MME comprises an Access Network Query Protocol or ANQP protocol server configured to support and to establish the ANQP protocol and an extensible authentication protocol module configured to support and to establish said extensible authentication protocol. Therefore, the Non Access Stratum function included in the base station is configured to support both protocols.

The system of the second aspect is adapted to implement the method of the first aspect.

The subject matter described herein can be implemented in software in combination with hardware and/or firmware, or a suitable combination of them. For example, the subject matter described herein can be implemented in software executed by a processor.

In accordance to a third aspect, there is provided a computer program product comprising a computer-readable medium having instructions stored thereon, the instructions being executed by one or more processors and the instructions comprising instructions for carrying out a method for inter-working different wireless technologies according to the steps of the method of the first aspect of the invention.

Present invention enables the support of standard 3GPP NAS procedures, like mobile terminal mobility, paging or location, as if the non-3GPP mobile terminal were a 3GPP-compliant mobile terminal. The invention enables the direct connection of a base station that does not support a 3GPP radio interface to the EPC.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF THE INVENTION

The proposed method and system allows a non-3GPP base station NU-eNB to be directly connected to the MME and the SGW of LTE's EPC, comprising a non-3GPP user mobile terminal or wireless terminal STA that can be wirelessly connected to said non-3GPP base station NU-eNB by means of a non-3GPP wireless interface, and said non-3GPP base station NU-eNB that includes the wireless physical layer and the required protocol stack to wirelessly communicate with said non-3GPP wireless terminal STA.

The non-3GPP base station NU-eNB includes the physical layer and the required protocol stack to implement a S1-U interface with said SGW, and the non-3GPP wireless terminal STA upper layer data is transported through said non-3GPP base station NU-eNB to said SGW by means of said S1-U interface, and therefore said SGW treats said non-3GPP base station NU-eNB as a 3GPP base station supporting a standard 3GPP S1-U interface. It also includes the physical layer and the required protocol stack to implement a S1-MME interface with said MME, and said non-3GPP base station NU-eNB includes a Non Access Stratum function or NAS function that emulates a 3GPP wireless terminal NAS function, and therefore said MME treats said non-3GPP base station NU-eNB as a 3GPP base station supporting a standard 3GPP S1-MME interface.

Moreover, the non-3GPP base station NU-eNB includes also the physical layer and the required protocol stack to implement an X2-C interface with a 3GPP eNB, and includes also the physical layer and the required protocol stack to implement an X2-U interface with a 3GPP eNB, and therefore said 3GPP eNB treats said non-3GPP base station NU-eNB as a 3GPP base station supporting a standard 3GPP X2 interface. Therefore, it can communicate with other non-3GPP base stations that include also said physical layer and said protocol stack to implement said X2-C and X2-U interfaces.

Figure 1:
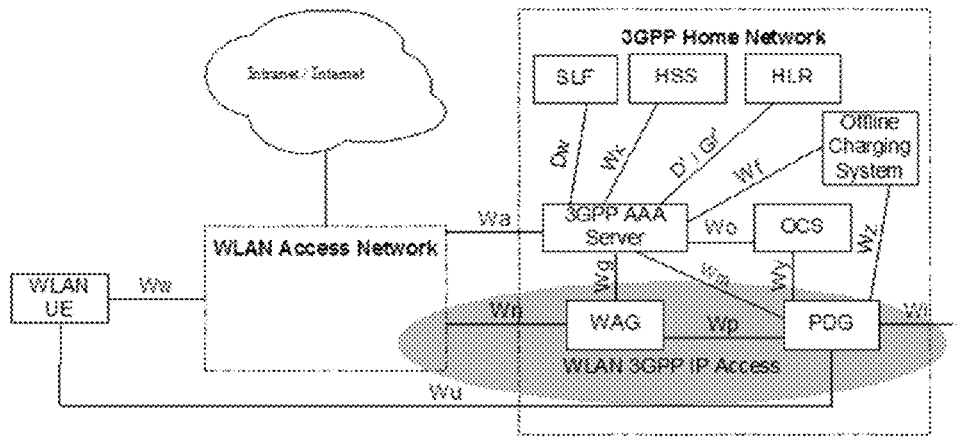
FIG. 1 is an illustration of a general 3GPP-WLAN inter-working reference model.
Figure 2:
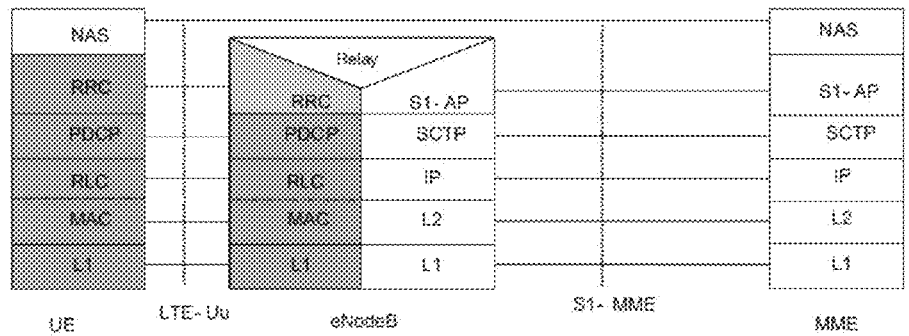
FIG. 2 illustrates the control plane protocol stack for the case of the 3GPP radio access network (RAN) and the evolved packet core (EPC).
Figure 3:
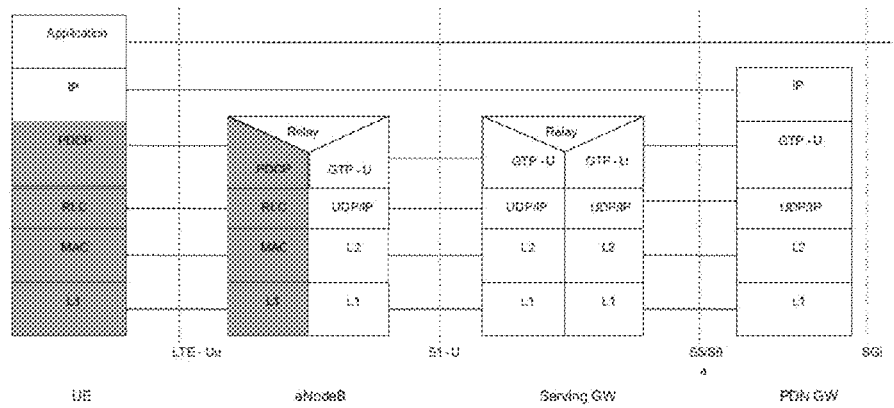
FIG. 3 illustrates the user plane protocol stack for the case of the 3GPP radio access network (RAN) and the evolved packet core (EPC)
Figure 4:
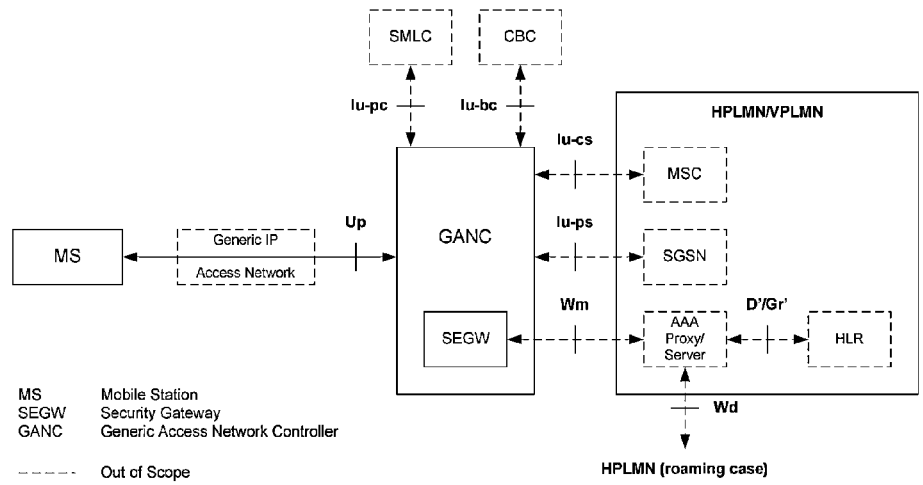
FIG. 4 is a GAN Iu mode functional architecture.
Figure 5:
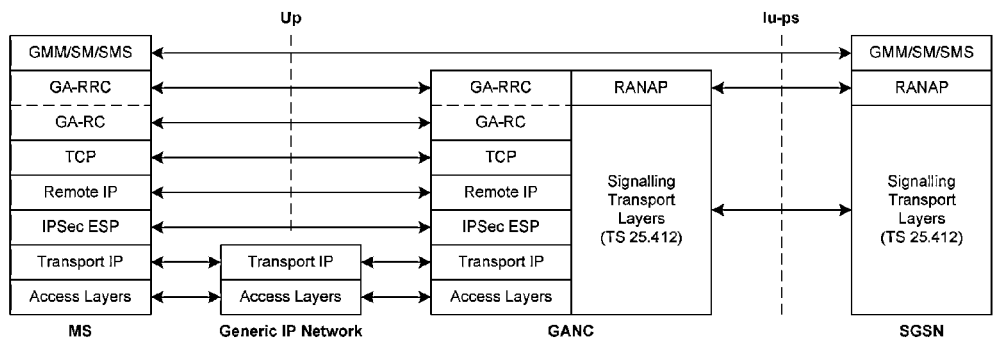
FIG. 5 is a PS Domain Control Plane Architecture.
Figure 6:
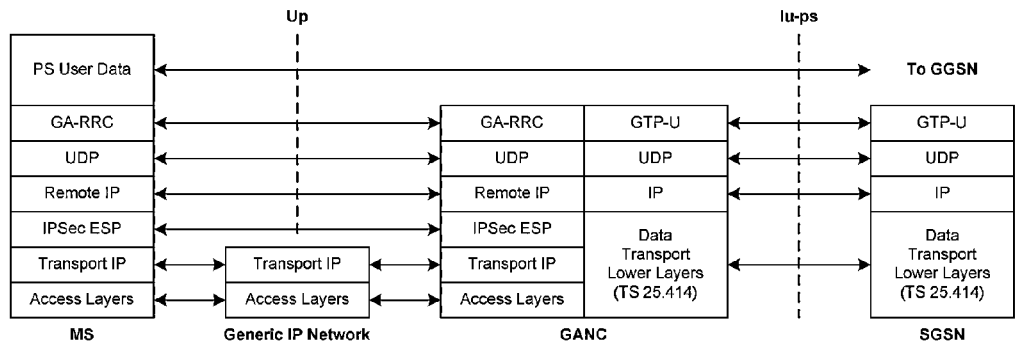
FIG. 6 is a PS Domain User Plane Protocol Architecture.
Figure 7:
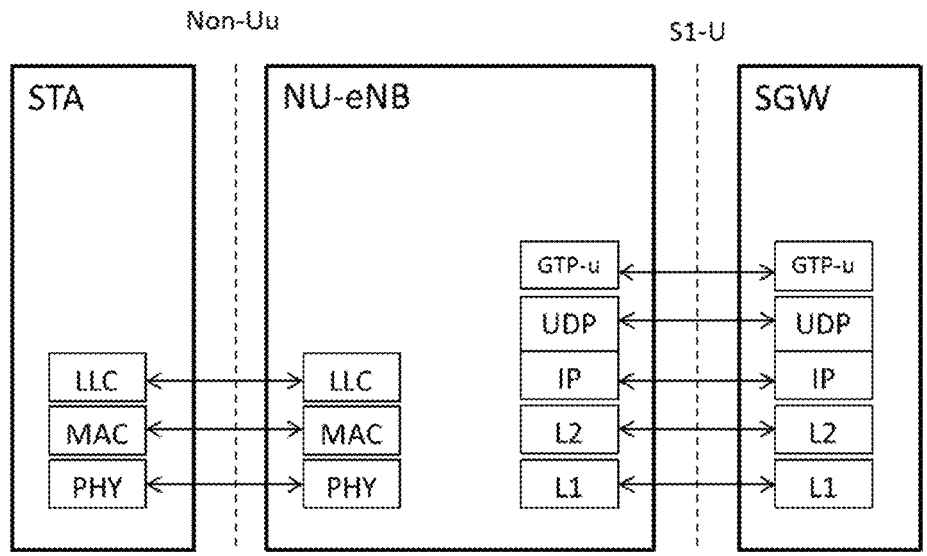
FIG. 7 illustrates an architecture, with the involved elements and interfaces, in which the proposed invention is implemented. As said, the invention allows the connection of a base station that has connected a user mobile terminal both supporting a given non-3GPP standard with an element, in this case a Serving Gateway, supporting the 3GPP standard.

In reference to FIG. 7, said non-3GPP wireless terminal STA, is wirelessly connected by means of a non-3GPP wireless interface with the non-3GPP base station NU-eNB. In the figure, the non-3GPP wireless interface is labeled as Non-Uu, highlighting it is different to the 3GPP standard Uu radio interface. The non-3GPP base station NU-eNB from the point of view of its wireless interface it is not supporting a 3GPP standard Uu radio interface but from the point of view of the SGW it is considered as an eNB, supporting a standard 3GPP S1-U interface. In the example of the figure, but not precluding any other implementation, both said STA and NU-eNB are implementing IEEE 802.11 physical layer and protocol stack for the Non-Uu interface, comprising the PHY, MAC and LLC layers. Regarding the S1-U interface between said NU-eNB and said SGW, both elements implement the standard 3GPP layers for that interface, namely L1, L2, IP, UDP and GTP-U.

Figure 8:
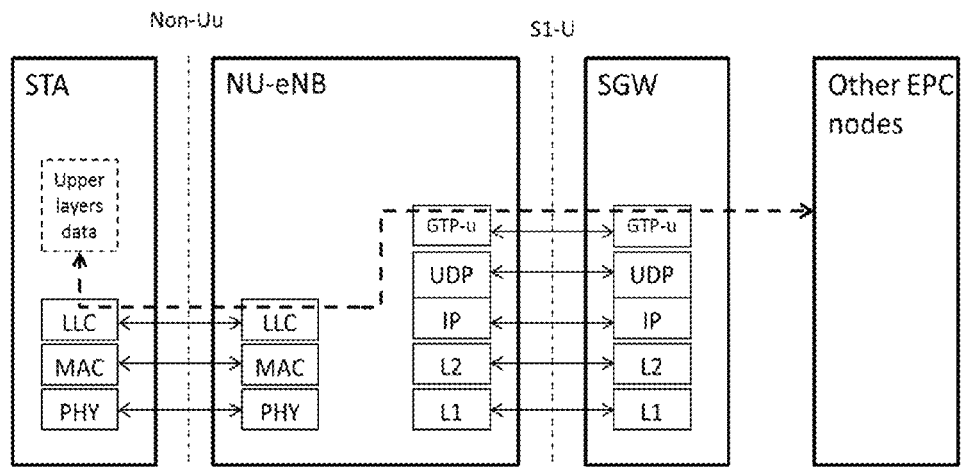
FIG. 8 shows how the user mobile terminal upper layer data is transported through the base station to the Serving Gateway by means of a S1-U interface, and how from said Serving Gateway said upper layer data can proceed to other elements in 3GPP's EPC.

FIG. 8 illustrates how said wireless terminal STA upper layer data is transported through said non-3GPP base station NU-eNB to said SGW by means of said S1-U interface, and how from said SGW said upper layer data can proceed to other elements in 3GPP's EPC.

Figure 9:
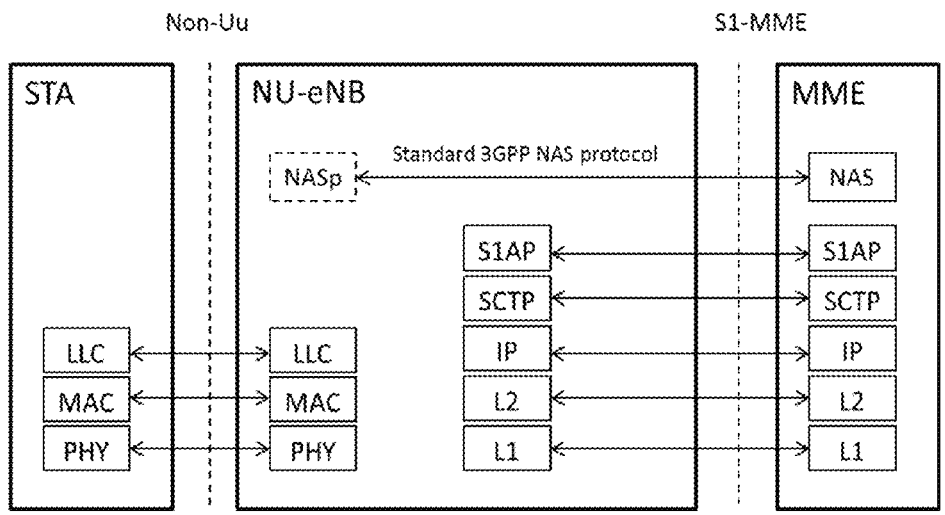
FIG. 9 illustrates the proposed solution for inter-working between different wireless technologies.

In FIG. 9, said non-3GPP wireless terminal STA is wirelessly connected by means of a non-3GPP wireless interface with the non-3GPP base station NU-eNB. Said STA, not being compliant with 3GPP specifications, does not include some of the control protocol layers of a 3GPP UE, namely the PDCP, RRC and NAS layers. Said non-3GPP base station NU-eNB includes said NAS function that emulates the NAS layer of a 3GPP-compliant UE, labeled as NASp in the figure. Said NASp terminates the NAS protocol between said MME and said non-3GPP base station NU-eNB as if said NASp were the NAS function in a 3GPP-compliant UE. Said S1-MME interface between said non-3GPP base station NU-eNB and said MME is based on the implementation of the standard 3GPP layers for that interface, namely L1, L2, IP, SCTP, S1 AP and NAS layers, and thanks to the inclusion of said NASp in the non-3GPP base station NU-eNB the MME can implement the standard NAS procedures between said MME and a 3GPP-compliant UE, as if said STA were a 3GPP-compliant UE.

Figure 10:
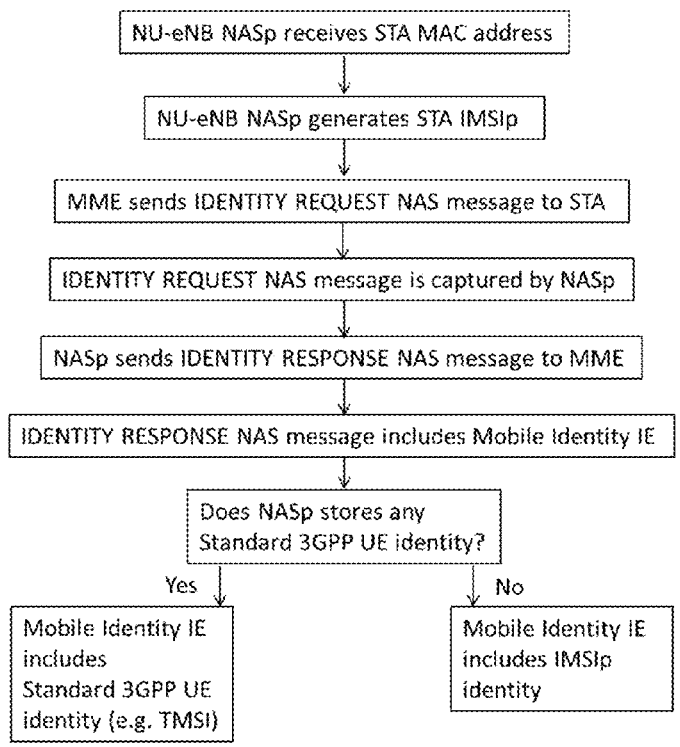
FIG. 10 is a flow diagram describing the process performed for generating an Identity Response NAS message.

According to an embodiment, as showed in FIG. 10, the NASp provides an IDENTITY RESPONSE in response to an IDENTITY REQUEST message from the MME, providing the requested identity of the wireless terminal STA. In accordance with said embodiment, the wireless terminal STA does not include a SIM card and does not support any NAS protocol authentication procedure, and in the case the MME has not previously assigned a temporary identity to the STA like the TMSI, the NASp stores an identity for the STA, named IMSIp identity, and the NASp Identity Response message will provide a Mobile Identity information element including said IMSIp identity, where the Type of Identity in octet 3 will follow any coding not currently used by the standard, for example but not precluding any other implementation, 111.

In one embodiment of this invention, the IMSIp consists on the three digits of the Mobile Country Code (MCC) of the country of the PLMN the NU-eNB belongs to, the two or three digits of the Mobile Network Code (MNC) of the PLMN of the NU-eNB belongs to, and the Mobile Subscriber Identification Number (MSIN) consists of the 48 binary digits of the MAC address of the STA.

Once the MME has received the Mobile Identity information element, it can check with the HSS through the S6a interface if the STA is authorized to receive services from the mobile network following the standard 3GPP procedures. The way of provisioning the IMSIp identity data in the HSS is out of the scope of this invention.

In the case the NASp stores a standard 3GPP UE identity, because the MME has previously assigned a temporary identity to the STA like the TMSI, the NASp Identity Response message will provide a Mobile Identity information element including said standard 3GPP UE identity, where the Type of Identity in octet 3 will follow the standard coding (for example 100 for TMSI).

Figure 11:
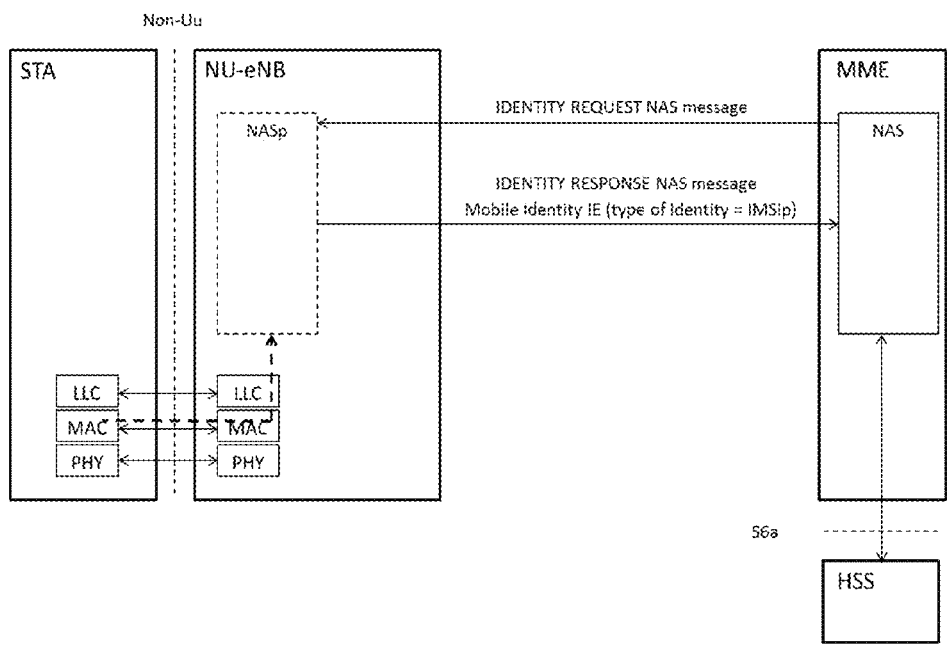
FIG. 11 illustrates an embodiment showing how said Identity Response NAS message is generated when the user mobile terminal does not include a SIM.

According to the embodiment of FIG. 11, it is illustrated how the NASp function in the non-3GPP base station NU-eNB communicates through the Non-Uu interface with the wireless terminal STA in order to receive the STA MAC address and then generating the IMSIp. The NASp function in the NU-eNB stores not only the ISMIp and the TMSI, but also the parameters and algorithms that are needed for the authentication and ciphering with the MME/HSS. The authentication and ciphering procedures are performed between the NASp and the MME/HSS, making use of standard EPS AKA authentication and key agreement procedures used in E-UTRAN.

A Global eNB ID IE, which can be send in the S1 SETUP REQUEST MESSAGE sent by the non-3GPP base station NU-eNB to the MME, includes a new identifier for the non-3GPP base station NU-eNB, as it described in table 4.

TABLE 4

| IE/Group Name | IE type and reference | Semantics description |
|---|---|---|
| PLMN Identity | | |
| eNB ID | | |
| >Macro eNB ID | | |
| >>Macro eNB ID | BIT STRING (20) | Equal to the 20 leftmost bits of the Cell Identity IE contained in the E-UTRAN CGI IE of each cell served by the eNB. |
| >Home eNB ID | | |
| >>Home eNB ID | BIT STRING (28) | Equal to the Cell Identity IE contained in the E-UTRAN CGI IE of the cell served by the eNB. |
| >Non-Uu eNB ID | | |
| >>NU-eNB ID | BIT STRING (28) | Equal to the Cell Identity IE contained in the E-UTRAN CGI IE of the cell served by the eNB. |

The E-UTRAN CGI information element in the NU-eNB ID is used to globally identify the NU-eNB cell, following the same procedures used by any Home eNB. In accordance with this embodiment, a base station can include non-3GPP base station NU-eNB functionalities and also Home eNB or Macro eNB functionalities, and therefore it can send a Global eNB ID IE to the MME that includes the NU-eNB ID, along with the Home eNB ID or the Macro eNB ID.

Furthermore, the non-3GPP base station NU-eNB can also send an NU-eNB DIRECT INFORMATION TRANSFER MESSAGE to the MME in order to transfer non-3GPP radio access information. This message includes an Intersystem Information Transfer Type IE, which includes a modified RIM information IE containing RIM PDU's indicating the characteristics of the non-3GPP radio access supported by the NU-eNB, and therefore RIM procedures will support the exchange of information, via the core network, with other GERAN BTS's, in UTRAN NB's, E-UTRAN eNB's and NU-eNB's.

In addition to that, the non-3GPP base station NU-eNB can also send a UE Radio Capability information message to the MME that includes an updated UE Radio Capability information element. The updated UE Radio Capability information element includes information reporting to the MME that the wireless terminal connected to the NU-eNB is connected by means of a non-3GPP radio interface. The UE Radio Access Capability Information field in the updated UE Radio Capability information element will include a "non-3GPP" octet string, or any other octet string describing said non-Uu radio interface, when the wireless terminal connected to the NU-eNB is connected by means of a non-3GPP radio interface.

Once the non-3GPP base station NU-eNB sends to the MME a Global eNB ID IE that includes a NU-eNB ID, and the non-3GPP base station NU-eNB sends a UE Radio Capability information message to the MME that includes a "non-3GPP" octet string in the UE Radio Access Capability Information field, then the MME can set up the mode of the operation of the wireless terminal STA attachment to the EPS as if it were a 3GPP UE in "PS mode 2" of operation, and then the wireless terminal STA can register only to EPS services, and the wireless terminal STA usage setting is "data centric". Then, the MME will make use of the subset of the NAS procedures and messages that are compatible with the wireless terminal STA and can make use of a subset of the S1 AP procedures and messages that are compatible with the wireless terminal STA. All subsequent NAS protocol information exchange between the MME and the wireless terminal STA will be managed by the NASp function in the non-3GPP base station NU-eNB.

Figure 12:
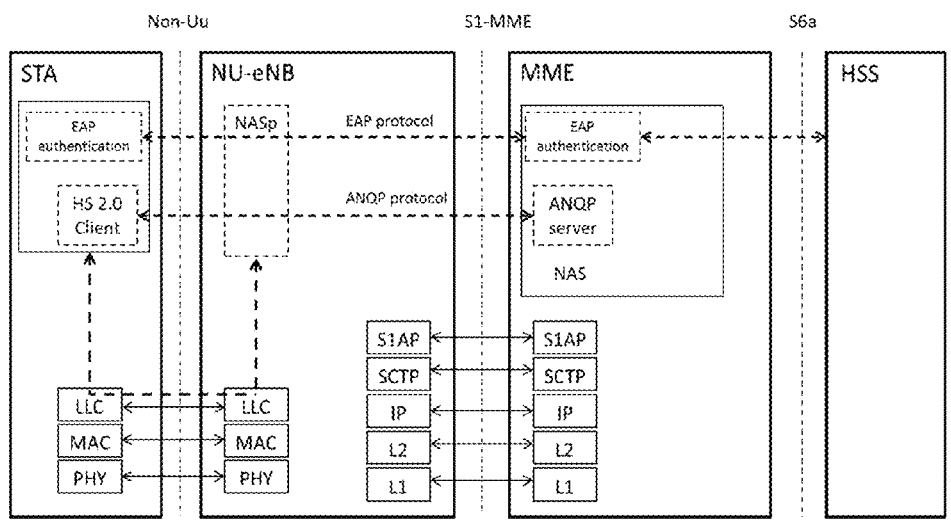
FIG. 12 illustrates an embodiment showing how the authentication is performed by means of the EAP and ANQP protocols.

Alternatively, in another embodiment of this invention and as illustrated in FIG. 12, the wireless terminal STA does not include a SIM card and the authentication is done by means of any extensible authentication protocol (EAP protocol), and the wireless terminal STA includes a wireless connection point module such as a Hot Spot 2.0 client that can support an Access Network Query Protocol (ANQP protocol) with an ANQP server. To this end the NAS function in the MME includes an extensible authentication protocol module for supporting the EAP protocol and an ANQP server. The EAP protocol in this case is transported by the NAS protocol, and is established between the NAS function in the MME and the NASp function in the non-3GPP base station NU-eNB, and the communication between the EAP function in the wireless terminal STA and the NASp function in the non-3GPP base station NU-eNB is done through the non-Uu interface.

The ANQP protocol, being transported by the NAS protocol, is established between the NAS function in the MME and the NASp function in the non-3GPP base station NU-eNB, and the communication between the Hot Spot 2.0 client in the wireless terminal STA and the NASp function in the non-3GPP base station NU-eNB is done through the non-Uu interface. Another aspect of this embodiment is that it allows the use of the wireless connection point procedures for wireless terminal STA mobility and roaming.

Present invention may be embodied directly in hardware, in a software module executed by one or more processors, or in a combination of the two. A software module may reside in any form of storage medium that is known in the art. Some examples of storage media that may be used include random access memory (RAM), flash memory, read only memory (ROM), EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The functions described may be implemented in hardware, software, firmware, or any combination thereof. If implemented in software, the functions may be stored as one or more instructions on a computer-readable medium. A storage media may be any available media that can be accessed by a computer.

The scope of the invention is given by the appended claims and all variations and equivalents which fall within the range of the claims are intended to be embraced therein.

The invention claimed is:

1. A method for inter-working between different wireless technologies, wherein a base station complying with a standardized wireless radio access technology provides wireless connectivity via a particular communication interface to at least one user mobile terminal also complying with said standardized wireless radio access technology, said method comprising connecting said base station with a Mobility Management Entity (MME) and/or a Serving Gateway of an Evolved Packet Core of a third Generation Partnership Project (3GPP) standard technology by performing following steps:

using a Non Access Stratum function included in said base station that collects a Media Access Control (MAC) address of the at least one user mobile terminal and further generates an international mobile subscriber identity (IMSI) based in said collected MAC address;

providing, by said Non Access Stratum function included in said base station, upon receiving from said MME an identity request for said at least one user mobile terminal, said generated IMSI via a S1 interface and based on a Non Access Stratum (NAS) protocol to a Non Access Stratum function included in said MME, said MME being in communication with a Home Subscription Server;

storing, by said Non Access Stratum function included in said base station, said generated IMSI together with a set of parameters and algorithms;

performing, between said Non Access Stratum function included in said base station and said MME and Home Subscription Server, an authentication and ciphering procedure of said at least one user mobile terminal by using said stored set of parameters and algorithms; and performing, by said Non Access Stratum function protocol in said base station, the termination of Non Access Stratum protocol messages with said MME, for management of mobility, paging and location procedures related with said at least one user mobile terminal, wherein said standardized wireless radio access technology and said 3GPP standard technology are different wireless technologies, and wherein said authentication and ciphering procedure at least comprises sending, by said Non Access Stratum function included in said base station to said Non Access Stratum function in said MME, a S1 setup request message comprising a Global eNB ID information element that includes an identifier categorizing said base station as a 3GPP standard technology uncompliant.

2. The method of claim 1, wherein the Non Access Stratum function included in said base station further sends to said Non Access Stratum function in said MME a direct information transfer message comprising an Inter-system Information Transfer Type information element that includes a radio access network information management element containing radio access network information management information management packet data units indicating characteristics of said standardized wireless radio access technology.

3. The method of claim 2, further comprising sending by the Non Access Stratum function included in said base station to said Non Access Stratum function in said MME a UE Radio Capability information message including an octet string that describes the technology supported by said particular communication interface used to provide the wireless connectivity between the base station and the at least one user mobile terminal.

4. The method of claim 3, wherein an operation mode of the user mobile terminal being set up, by said MME, as a PS mode 2 that describes said user mobile terminal as data centric, and the user mobile terminal and the MME exchanging information via the Non Access Stratum function included in said base station.

5. A method for inter-working between different wireless technologies, wherein a base station complying with a standardized wireless radio access technology provides wireless connectivity via a particular communication interface to at least one user mobile terminal also complying with said standardized wireless radio access technology, said method comprising connecting said base station with a Mobility Management Entity (MME) and/or a Serving Gateway of an Evolved Packet Core of a third Generation Partnership Project (3GPP) standard technology by performing following steps:

using a Non Access Stratum function included in said base station that collects a Media Access Control (MAC) address of the at least one user mobile terminal and further generates an international mobile subscriber identity (IMSI) based in said collected MAC address;

providing, by said Non Access Stratum function included in said base station, upon receiving from said MME an identity request for said at least one user mobile terminal, said generated IMSI via a S1 interface and based on a Non Access Stratum (NAS) protocol to a Non Access Stratum function included in said MME, said MME being in communication with a Home Subscription Server;

storing, by said Non Access Stratum function included in said base station, said generated IMSI together with a set of parameters and algorithms;

performing, between said Non Access Stratum function included in said base station and said MME and Home Subscription Server, an authentication and ciphering procedure of said at least one user mobile terminal by using said stored set of parameters and algorithms;

performing, by said Non Access Stratum function protocol in said base station, the termination of Non Access Stratum protocol messages with said MME, for management of mobility, paging and location procedures related with said at least one user mobile terminal;

performing said authentication and ciphering procedure by an extensible authentication protocol based on a wireless connection point module included in the user mobile terminal and using authentication credentials of the user mobile terminal, said authentication protocol being established between said Non Access Stratum function included in said base station and said Non Access Stratum function included in said MME; and establishing an Access Network Query Protocol (ANQP) between the Non Access Stratum function included in said base station and the Non Access Stratum function included in said MME supporting said wireless connection point module and said extensible authentication protocol, said ANQP being transported by said NAS protocol, wherein said standardized wireless radio access technology and said 3GPP standard technology are different wireless technologies.

6. The method of claim 1, wherein said standardized wireless radio access technology comprises an IEEE standard radio access technology at least according to IEEE 802.11 standard.

7. A system for inter-working between different wireless technologies, the system comprising a base station complying with a standardized wireless radio access technology providing wireless connectivity via a particular communication interface to at least one user mobile terminal also complying with said standardized wireless radio access technology, said base station comprising a hardware processor configured to:

implement an interface to communicate with a Serving Gateway of an Evolved Packet Core of a third Generation Partnership Project (3GPP) standard technology;

implement an interface to communicate with a Mobility Management Entity (MME) of said Evolved Packet Core of said 3GPP standard technology;

implement a plurality of interfaces to communicate with at least a base station complying with said 3GPP standard technology; and implement a Non Access Stratum function configured to:
collect a Media Access Control (MAC) address of said user mobile terminal and further generate an international mobile subscriber identity (IMSI) based in said collected MAC address;

provide, upon receiving an identity request from said MME for said at least one user mobile terminal, said generated IMSI via said interface and based on a Non Access Stratum (NAS) protocol to a Non Access Stratum function included in said MME;

store said generated IMSI together with a set of parameters and algorithms;

perform with said MME and a Home Subscription Server an authentication and ciphering procedure of said at least one user mobile terminal by using said stored set of parameters and algorithms; and perform the termination of Non Access Stratum protocol messages with said MME, for the management of mobility, paging and location procedures related with said at one user mobile terminal, wherein:
said standardized wireless radio access technology and said 3GPP standard technology are different wireless technologies, said at least one user mobile terminal includes a wireless connection point module configured to support an extensible authentication protocol, said Non Access Stratum function included in said MME comprises an Access Network Query Protocol server configured to support and to establish an Access Network Query Protocol (ANAP) and an extensible authentication protocol module configured to support and to establish said extensible authentication protocol, and said Non Access Stratum function included in said base station is further configured to support both protocols.

8. The system of claim 7, wherein said standardized wireless radio access technology comprises an IEEE standard radio access technology at least according to IEEE 802.11 standard.

9. A computer program product comprising a non-transitory computer-readable medium having instructions stored thereon, the instructions being executed by one or more processors and the instructions comprising instructions for carrying out a method for inter-working different wireless technologies according to the steps of claim 1.

* * * * *